United States Patent
Garde et al.

(10) Patent No.: US 10,518,896 B2
(45) Date of Patent: Dec. 31, 2019

(54) APPARATUS AND METHOD FOR DETECTING STALL CONDITION

(71) Applicant: Honeywell International Inc., Morris Plains, NJ (US)

(72) Inventors: Jason Garde, Anthem, AZ (US); Grant Lodden, Minnetrista, MN (US); Xiao Zhu Fan, Plymouth, MN (US); Matthew Wiebold, Northfield, MN (US)

(73) Assignee: Honeywell International Inc., Morris Plains, NJ (US)

( * ) Notice: Subject to any disclaimer, the term of this patent is extended or adjusted under 35 U.S.C. 154(b) by 278 days.

(21) Appl. No.: 15/387,462

(22) Filed: Dec. 21, 2016

(65) Prior Publication Data

US 2018/0170571 A1 Jun. 21, 2018

(51) Int. Cl.
| | |
|---|---|
| B64D 43/02 | (2006.01) |
| G05D 1/00 | (2006.01) |
| G01S 17/88 | (2006.01) |
| G01P 5/26 | (2006.01) |
| G01L 13/00 | (2006.01) |
| G01L 11/02 | (2006.01) |
| G01P 13/02 | (2006.01) |

(52) U.S. Cl.
CPC .............. *B64D 43/02* (2013.01); *G01L 11/02* (2013.01); *G01L 13/00* (2013.01); *G01P 5/26* (2013.01); *G01P 13/025* (2013.01); *G01S 17/88* (2013.01); *G05D 1/0055* (2013.01)

(58) Field of Classification Search
CPC ...... B64D 43/02; G05D 1/0055; G01L 13/00; G01L 11/02; G01P 5/26

USPC .......................................................... 701/14
See application file for complete search history.

(56) References Cited

U.S. PATENT DOCUMENTS

| | | |
|---|---|---|
| 6,751,532 B2 | 6/2004 | Inokuchi |
| 7,499,181 B2 | 3/2009 | Mirand et al. |
| 8,695,412 B2 | 4/2014 | Mandle |
| 8,915,709 B2 | 12/2014 | Westergaard |
| 2005/0085959 A1* | 4/2005 | Feyereisen ........... G01C 23/005 701/14 |

(Continued)

FOREIGN PATENT DOCUMENTS

| | | |
|---|---|---|
| EP | 0978718 | 2/2000 |
| WO | 2012089210 A1 | 7/2012 |

OTHER PUBLICATIONS

European Patent Office, "Extended European Search Report from EP Application No. 17200094.5 dated Jan. 23, 2018", "from Foreign Counterpart of U.S. Appl. No. 15/387,462", filed Apr. 23, 2018, pp. 1-7, Published in: EP.

*Primary Examiner* — Khoi H Tran
*Assistant Examiner* — Rodney P King
(74) *Attorney, Agent, or Firm* — Fogg & Powers LLC (57) ABSTRACT

In one embodiment, a method of determining the onset of a stall condition in a vehicle is provided. The method comprises: measuring, with a stall detection system, data which would indicate the presence of turbulent fluid flowing proximate to a foil; determining from the data whether an onset of a stall condition has occurred; and upon determining the onset of the stall condition, performing at least one of: issuing an alert, and causing the vehicle to avoid or exit the stall condition, and cease such activity when the onset of the stall condition no longer exists.

16 Claims, 8 Drawing Sheets

(56) References Cited

U.S. PATENT DOCUMENTS

| | | | |
|---|---|---|---|
| 2006/0262324 A1* | 11/2006 | Hays | G01N 21/47 |
| | | | 356/519 |
| 2013/0311013 A1 | 11/2013 | Rogers et al. | |
| 2014/0227098 A1* | 8/2014 | Houck, III | F01D 5/141 |
| | | | 416/223 R |
| 2016/0305977 A1 | 10/2016 | Genevrier et al. | |

* cited by examiner

APPARATUS AND METHOD FOR DETECTING STALL CONDITION

BACKGROUND

Since their advent, airplanes have been susceptible to stalls which occur when an air foil, e.g. a wing, is unable to provide sufficient lift to permit the pilot of the aircraft to control the aircraft, e.g. maintaining level or climbing flight. Stalls can lead to catastrophic situations such as the aircraft crashing to the ground and loss of life.

Stalls can occur due to the disruption of laminar airflow over a surface of the airfoil which often occurs when an angle of attack of the aircraft is too steep. In such an event, the laminar airflow can become turbulent, diminishing the lift provided by the airfoil.

Aircraft component manufacturers have developed mechanical angle of attack vanes which are placed on aircraft fuselage. The mechanical angle of attack vanes provide a warning to the aircraft's pilot when the aircraft's angle of attack reaches a threshold indicative of possible, future occurrence of a stall condition. Other sensors, such as tubes and other vanes are used to detect the reversal of airflow over a surface of the airfoil which are also used to provide a warning to the pilot of a stall condition.

Such sensors are imperfect. The sensors are susceptible to severe weather conditions, such as icing, and mechanical wear which impair or incapacitate the sensors. The other sensors provide warnings that are untimely, providing the pilot with too little time to change the vector velocity of the aircraft to avoid a stall. Therefore, there is a need for a more robust way to provide stall warnings prior to the occurrence of such stalls.

SUMMARY

In one embodiment, a method of determining the onset of a stall condition in a vehicle is provided. The method comprises: measuring, with an stall detection system, data which would indicate the presence of turbulent fluid flowing proximate to a foil; determining from the data whether an onset of a stall condition has occurred; and upon determining the onset of the stall condition, performing at least one of: issuing an alert, and causing the vehicle to avoid or exit the stall condition, and cease such activity when the onset of the stall condition no longer exists.

DRAWINGS

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below include techniques for detecting the onset of a stall condition for a vehicle. The onset of a stall condition means both conditions prior to a stall occurring and conditions after a stall has occurred. As a result, the operator of the vehicle, or the vehicle automatically, can take action to prevent the stall.

A stall detection system is used to overcome the environmental and latency issues described above. In one embodiment, the stall detection system characterizes the fluid flow, e.g. air flow, over a surface of a foil, e.g. an airfoil such as a wing, of a vehicle. In another embodiment, the stall detection system characterizes fluid flow over a portion of a surface of the foil of a vehicle where the onset of the stall detection will first occur. A rapid increase in non-laminar fluid flow proximate to the foil, or a rapid change in differential fluid pressure about the foil, is indicative of the onset of a stall condition. Thus, the stall detection system detects the onset of a stall condition based upon such conditions by characterizing such fluid flow.

Figure 1:
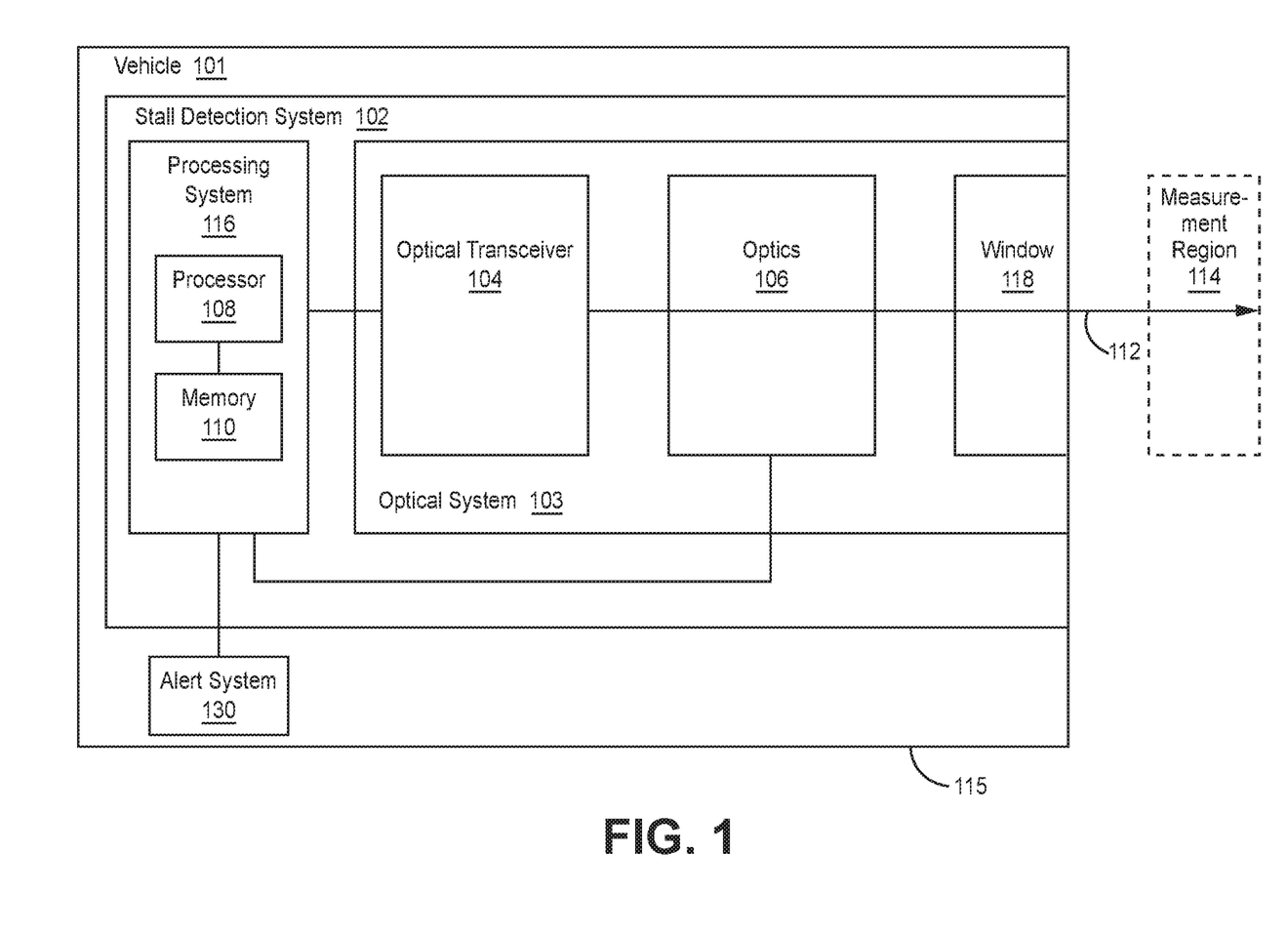
FIG. 1 is a block diagram of an exemplary embodiment of a vehicle 101 that includes a stall detection system.

FIG. 1 is a block diagram of an exemplary embodiment of a vehicle 101 that includes a stall detection system 102. The vehicle 101 can be an aircraft or any other type of vehicle that has a foil over which the fluid flows, and is susceptible to a stall condition.

In one embodiment, the stall detection system 102 includes one or more optical systems 103. Each optical system 103 includes at least one optical transceiver 104 configured to transmit and receive at least one light beam 112, and characterize the backscattered, light, e.g. detect a signal variation in backscattered light. Backscattered light will travel towards the optical system 103. Signal variation means variation in received scattered light intensity, spectrum shape, or Doppler shift. One example of an increase in signal variation are variations of the standard deviation of the measured velocity along the line of site of at least one light beam 112, or an increase in the temperature or width of the backscatter. The stall detection system 102 characterizes light backscattered from, e.g. makes measurements in, at least one measurement region 114.

The stall detection system 102 is configured to ascertain the onset of a stall condition in the at least one measurement region 114 by characterizing the fluid flowing in the at least one measurement region 114 proximate to a foil. Being proximate to the foil, e.g. for the at least one measurement region 114 or the at least one laser light beam 112, means either above, below, in front of a leading edge, or behind a trailing edge of the foil. As will be further described, such characterization may be performed by ascertaining a Doppler shift in the frequency of the backscattered light, a decrease in differential density or pressure (above and below the foil), an increase in measured signal variation in the Doppler shift of the backscattering from the at least one light beam 114 and/or in the measured differential density. In one embodiment, signal variation may include a rapid fluctuation of backscattered light levels or in Doppler shift frequency. In another embodiment, the measurements represent an average, e.g. of Doppler shift, corresponding to the fluid flow, e.g. molecular and particle movement, in a measurement region 114.

In one embodiment, the stall detection system 102 includes a processing system 116. In another embodiment, the processing system 116 includes a processor 108 coupled to a memory 110. In a further embodiment, the processor 108 can be a state machine, field programmable gate array, or central processing unit. The memory 110 may store data and/or executable code to facilitate the operation of the stall detection system 102.

In one embodiment, the optical system 103 includes more than one optical transceiver 104. In another embodiment, each optical transceiver 104 emits at least one light beam 112 and detects backscattered light from the at least one light beam 112. In a further embodiment, the optical transceiver 104 is a laser transceiver which emits at least one laser light beam and detects backscattered light from such one or more laser beams. In yet another embodiment, the optical system 103 is coupled to the processing system 116.

In one embodiment, when implemented with at least one laser transceiver, the stall detection system 102 may be implemented with one or more light detection and ranging (LIDAR) systems. When using LIDAR systems, the optical transceiver 104 provides the processing system 116 with a Doppler shift frequency corresponding to a difference in the frequency of the transmitted light and received backscattered light. In another embodiment, the optical transceiver 104 includes an optical transmitter that is a continuous wave (CW) laser. In a further embodiment, the optical transceiver 104 includes an optical transmitter that is a pulsed laser. However, light sources other than laser may be used to implement an optical transceiver 104 capable of generating a Doppler shift frequency corresponding to a difference in the frequency of the transmitted light and received, backscattered light. Such a Doppler shift frequency may be provided, by optical transceivers with other light sources, to the processing system 116.

In one embodiment, the optical transceiver 104 provides the processing system 116 with the intensity of the back scattered light which can be used to estimate the fluid density, and correspondingly the pressure, in the measurement region 114. In another embodiment, the fluid pressure, p equals or is approximately equal to R*r*T, where R is a constant corresponding to the fluid, r is the fluid density, and T is the fluid temperature. A parameter related to pressure may be density or pressure itself.

In one embodiment, the stall detection system 102 includes optics 106 to direct transmitted light from and backscattered light to the optical transceiver 104. Thus, the optics 106 is optically coupled to the optical transceiver 104. In another embodiment, the optics 106 may include separate optics for the optical transmitter and for the optical receiver. In a further embodiment, the optics 106 may include one or more lenses and/or one or more mirrors. In yet another embodiment, the optics 106 facilitate, e.g. using mirrors, transmitting light in, and receiving backscattered light from, different directions. In yet a further embodiment, the optical transceiver 104, or a portion thereof such as a detector, can be moved. Thus, the optical system 103 can transmit and receive light in different directions within a region. In another embodiment, the optical system 103 can scan, transmitting and receiving light within such a region. In yet a further embodiment, such scanning and/or light transmission is controlled by the processing system 116 which is coupled to the optical transceiver 104 and the optics 106.

In one embodiment, the stall detection system 102, or alternatively only the optical system 103, is mounted on an outer surface, or skin, 115 of the vehicle 101. In another embodiment, the stall detection system 102, or alternatively only the optical system 103, is mounted within the vehicle 101, e.g. mounted near with the outer surface 115 of the vehicle 101. In a further embodiment, the optical system 103 includes a window 118 permitting light to be transmitted and received by the optical system 103, within the vehicle 101, through the outer surface 115 of the vehicle 101. The window 118 avoids having an opening, or penetration, which would undermine fluid dynamics, e.g. aerodynamics, of the vehicle 101 and/or undermine the environment within the vehicle 101 which may be, e.g. pressurized and/or oxygenated. Further, the window 118 may be flush mounted to with the outer surface 115 of the vehicle 101 so that the fluid dynamics of the vehicle 101 is not undermined.

If only the optical system 103 is located proximate to the outer surface 115 of the vehicle 101, then the processing system 116 can be located elsewhere in the vehicle 101. In one embodiment, the processing system 116 can be another component of the vehicle 101 such as a vehicle control system, e.g. a flight control system, a vehicle management system, e.g. a flight management system, or a vehicle management computer, e.g. a flight management computer.

In one embodiment, the vehicle 101 includes an alert system 130 coupled to the stall detection system 102. In another embodiment, the alert system 130 is one or more of the vehicle management system (e.g. a flight management system), the vehicle management computer (e.g. a flight management computer), and one or more audio and/or visual systems. The alert system 130 is configured to generate an alert when the stall detection system 102 detects an onset of a stall condition, and to cease such an alert when the onset of a stall condition no longer exists. In a further embodiment, the alert system notifies the vehicle 101 and/or an operator of the vehicle 101 of the onset of a stall condition so that corrective action can be taken by the operator and/or the vehicle 101. In yet another embodiment, the alert system notification directs the vehicle 101 to automatically, e.g. with an automatic pilot system, avoid or exit a stall condition, and to cease such action when the onset of a stall condition no longer exists. In yet a further embodiment, the processing system 116 may both issue an alert, and cause the vehicle 101, e.g. through the alert system 130, to avoid or exit the stall condition, and cease such activity when the onset of a stall condition longer exists.

Figure 2A:
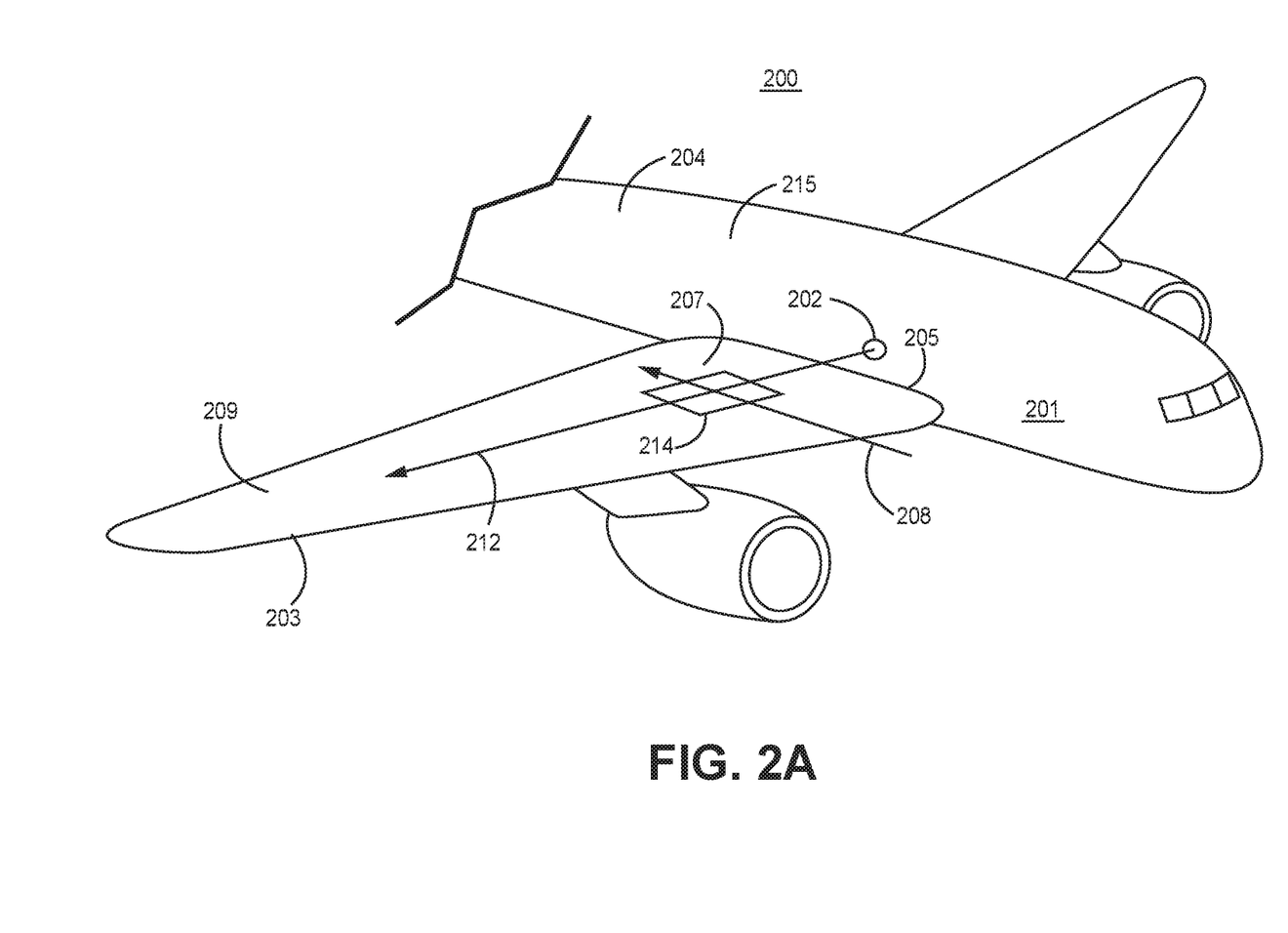
FIG. 2A illustrates an exemplary placement of a stall detection system proximate to a foil of a vehicle.

FIG. 2A illustrates an exemplary placement 200 of the stall detection system 202 proximate to a foil 203, e.g. wing, of a vehicle 201, e.g. an aircraft. Although the stall detection system 202 is specified, just the optical system 103 can be used in its place. In one embodiment, the optical system 103 can be coupled to a common processing system 116.

The stall detection system 202 is placed proximate to the foil 203. In one embodiment, the stall detection system 202 is placed on the outer surface 215 of, or in the body 204 of, the vehicle 201, e.g. just above the foil 203, at the juncture 205 of the foil 203 and the body 204, or on or in the foil 203 towards the body 204.

In one embodiment, the stall detection system 202 emits at least one light beam 212 perpendicular or substantially perpendicular to fluid flow 208 over a surface 209 of the foil 203. In one embodiment, the stall detection system 202 makes parameter measurements in a measurement region 214 just above a portion of the surface 209 of the foil 203. In another embodiment, the measurement region 214 begins where the at least one light beam 212 originates from the stall detection system 202.

When the stall detection system 202 emits at least one light beam 212 over the surface 209 of the foil 203, some of the light is backscattered in the measurement region 214 due to Rayleigh scattering from fluid molecules (e.g. air molecules including oxygen and nitrogen), and from Mie scattering from particles or aerosols (e.g. dust, water droplets, and ice crystals). When the emitted at least one light beam 212 is perpendicular or substantially perpendicular to the fluid flow 208 over the surface 209 of the foil 203, there is no bulk Doppler shift in the frequency of the backscattering of the transmitted at least one light beam 212 will occur if there is no onset of a stall condition, e.g. laminar fluid flow over the foil 203. However, for example, at the onset of a stall condition, the fluid flow 208, e.g. near a root 207 of the foil 203, will transition from laminar to turbulent fluid flow. This indicates that fluid flow is separating from the foil 203. The turbulent fluid flow will have a vector velocity component in the direction of and/or away from the at least one light beam 212. As a result, the stall detection system 202 will measure a Doppler shift in the frequency of the backscatter of the transmitted at least one light beam 212. Also, the stall detection system 202 may measure an increase in signal variation (described above) which may also indicate turbulent fluid flow. The measured Doppler shift, and/or increased signal variation are indicia of the onset of a stall condition. As a result, upon detecting any of such indicia, the stall detection system 202 commands the alert system 130 to issue an alert, e.g. to the vehicle 201 and/or the operator of the vehicle 201 so that corrective action can be taken by the operator of the vehicle 201 and/or the vehicle 201.

In another embodiment, the stall detection system 202 emits at least one light beam 212 that is skewed from being substantially perpendicular to the chord of the foil 203. In this embodiment, during normal operation with laminar fluid flow over a surface of the foil 203, there will be a Doppler shift between the transmitted and received light indicative of speed of the fluid flow 208 over a surface of the foil 203 based upon the relationship:

Doppler shift frequency=((speed of airflow over a surface of the airfoil)*2*frequency of light waves*cos(Θ))/c, where Θ is the angle between the at least one light beam 214 and the vector of the fluid flow 208, and c is the velocity of the light in the fluid.

The onset of a stall condition can be determined by detecting a sudden, large change in Doppler shift which indicates turbulent fluid flow. Further any measured increase in signal variation may also indicate turbulent fluid flow.

In one embodiment, the foil 203 may have a washout design so that the onset of the stall condition first occurs at the root 207 of the foil 203 which is proximate to the body 204. As a result, the stall detection system 202 should be mounted near the root 203, and the measurement region 114 should be at or about the root 207.

Figure 2B:
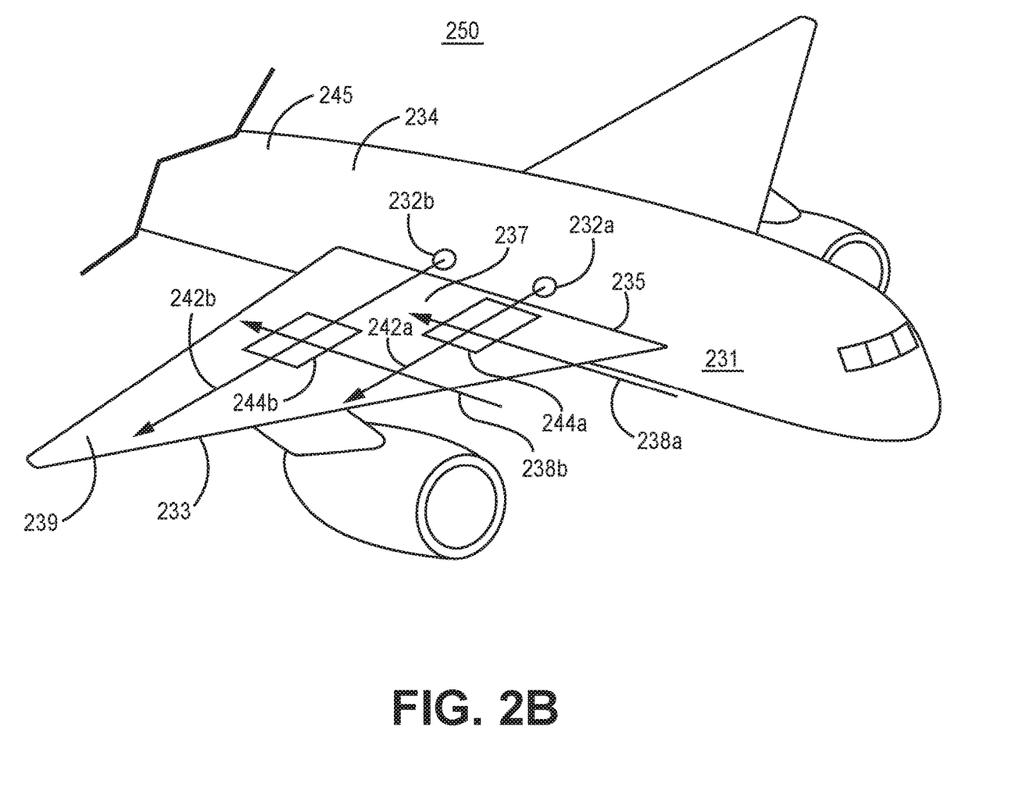
FIG. 2B illustrates exemplary placement of a first stall detection system and a second stall detection system proximate to a foil of a vehicle.

In one embodiment, the onset of a stall condition may occur in one or more regions of the foil 203. FIG. 2B illustrates exemplary placement 250 of a first stall detection system 232a and a second stall detection system 232b proximate to a foil 233 of a vehicle 231. In another embodiment, more than two stall detection systems can be placed proximate to a foil 233 of a vehicle 231. Although the first and second stall detection systems 232a, 232b are specified, just optical systems 103 can be used in their place. In a further embodiment, the optical systems 103 can be coupled to a common processing system 116.

The first and second stall detection systems 232a, 232b are placed at two different locations on or in the body 234 of the vehicle 231, e.g. at two different locations on the outer surface 245 of the body 234 just above the foil 233, at the juncture 235 of the foil 233 and the body 234, or on the foil 233 towards the body 234. In this embodiment, a first at least one light beam 242a from the first stall detection system 232a, and a second at least one light beam 242b from the second optical detection system 232b are used to measure respectively a first fluid flow 238a and a second fluid flow 238b. Such measurements are respectively in a first measurement region 244a and a second measurement region 244b over a surface 239 of the foil 233.

In one embodiment, the first and second stall detection systems 232a, 232b together detect the onset of a stall condition. In another embodiment, the second stall detection system 232b detects the onset of a stall condition, in a second measurement region 244b, where a stall condition would, e.g. first, occur, such as at the root 237 of the foil 233. The first stall detection system 232a detects, e.g. elsewhere on the foil 233, the onset of a stall condition, in the first measurement region 244a, which occurs after the onset of the stall condition in the second stall detection system 232b. Thus, the measurements of the first stall detection system 232a and the second stall detection system 232b can be compared, e.g. by the processing system 116, to confirm or verify the onset of a stall condition. The onset of a stall condition is determined using at least one of the techniques described with respect to the embodiments of FIG. 2A. Upon determining, e.g. confirming, the onset of a stall condition, the processing system(s) 116 of one or both stall detection systems 232a, 232b commands the alert system 130 to issue an alert, e.g. to the vehicle 231 and/or the operator of the vehicle 231 so that corrective action can be taken by the operator of the vehicle 231 and/or the vehicle 231.

Figure 2C:
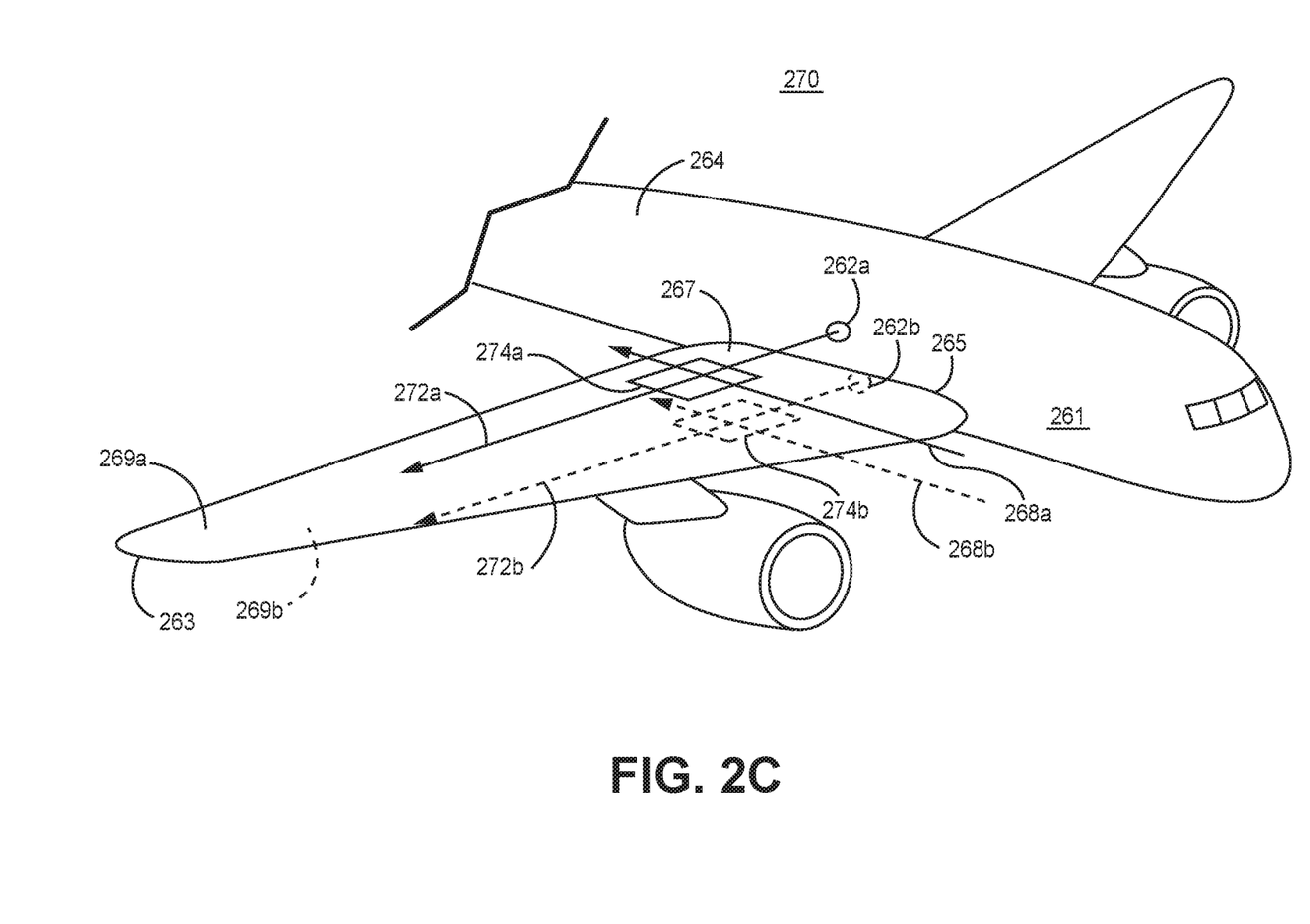
FIG. 2C illustrates another exemplary placement of a first stall detection system and a second stall detection system proximate to a foil of a vehicle.

FIG. 2C illustrates another exemplary placement 270 of a first stall detection system 262a and a second stall detection system 262b proximate to a foil 263 of a vehicle 261. In another embodiment, more than two stall detection systems can be placed proximate to a foil 263 of a vehicle 261. Although the first and second stall detection systems 262a, 262b are specified, just optical systems 103 can be used in their place. The optical systems 103 can be coupled to a common processing system 116.

The first and second stall detection systems 262a, 262b are respectively placed just above a top surface 269a of the foil 263 and just below a bottom surface 269b of the foil 263, e.g. both at the juncture 265 of the foil 263 and a body 264, or on the foil 263 towards the body 264. In one embodiment, a first at least one light beam 272a from the first stall detection system 262a can be used to characterize a first fluid flow 268a on the top surface 269a of the foil 263. In another embodiment, a second at least one light beam 272b from the second optical detection system 262b can be used to characterize a second fluid flow 268b on the bottom surface 269b the foil 263. Such measurements are respectively made in a first measurement region 274a and a second measurement region 274b which are respectively above the top surface 269a and below the bottom surface 269b of the foil 263.

In one embodiment, the first stall detection system 262a detects the onset of a stall condition using at least one of the techniques described with respect to the embodiments of FIG. 2A. In another embodiment, the first stall detection system 262a detects the onset of a stall condition where a stall condition would, e.g. first, occur, such as at the root 267 of the foil 263. In a further embodiment, the second stall detection system 262b would be similarly located as the first stall detection system 262a, but on the other side of the foil 263.

Further, the first stall detection system 262a and the second stall detection system 262b are used to determine the differential pressure above and below the foil 263. In one embodiment, the first stall detection system 262a and the second stall detection system 262b measure fluid density respectively above and below the foil 263. The fluid density measurement is used to determine the differential pressure above and below the foil 263. If the differential pressure drops below a threshold level, or if it changes dramatically in a short period of time, this may indicate the onset of a stall condition. In another embodiment, the vector velocity measurements of the first stall detection system 262a and differential fluid density measurements can be compared, e.g. by the processing system 116, to confirm the onset of a stall condition. Upon determining, e.g. confirming, the onset of a stall condition, the processing system(s) 116 of one or both stall detection systems 262a, 262b commands the alert system 130 to issue an alert, e.g. to the vehicle 261 and/or the operator of the vehicle 261 so that corrective action can be taken by the operator of the vehicle 261 and/or the vehicle 261.

Figure 3A:
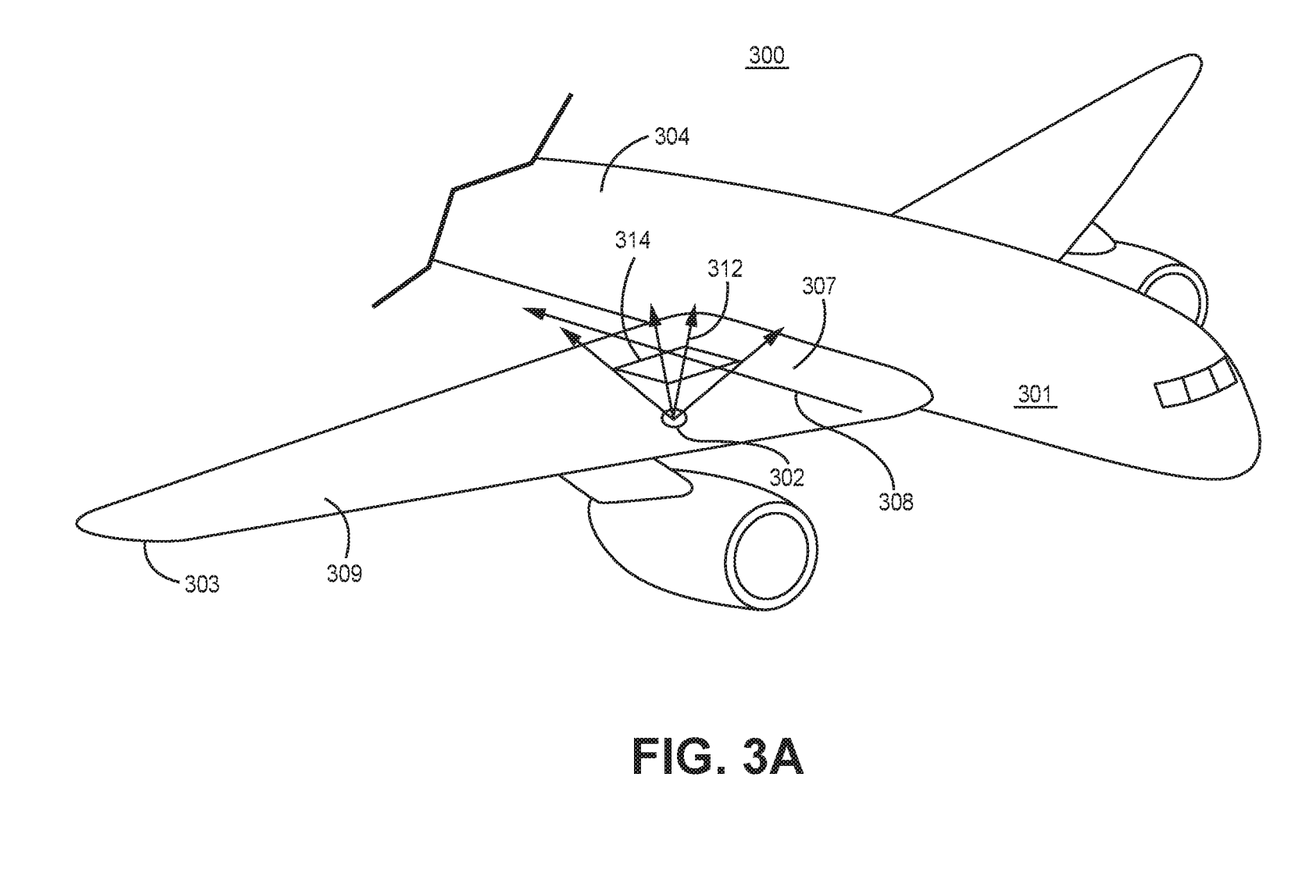
FIG. 3A illustrates an exemplary placement of a stall detection system on or in a foil of a vehicle.

FIG. 3A illustrates an exemplary placement 300 of a stall detection system 302 on or in a foil 303 of a vehicle 301. Although a stall detection system 302 is specified, just the optical system 103 can be used in its place.

In one embodiment, the stall detection system 302 is mounted on or in the foil 303, having a measurement region 314 above the foil 303 where the onset of a stall condition first occurs. In another embodiment, the stall detection system 302 is mounted at the root 307 of the foil 303 where the onset of the stall condition first occurs.

In the embodiment illustrated in FIG. 3A, the stall detection system 302 detects the vector velocity of fluid flow 308 over a surface 309 of a foil 303 in the measurement region, e.g. based upon the Doppler shift of the backscattered light. The vector velocity indicates fluid speed and direction in the corresponding measurement region, and, in the absence of turbulent fluid flow, an angle of sideslip, angle of attack, and speed, e.g. air speed, of the vehicle 301. Further, each stall detection system can also determine pressure, e.g. by determining density based upon the intensity of the backscattered light.

If the fluid flow 308 over the surface 309 of the foil 303 is detected to slow below a threshold velocity, or change direction by threshold angle, e.g. reverse, this is indicia of the onset of turbulence, and thus the onset of a stall condition. In one embodiment, the threshold velocity and/or threshold angle may be dependent upon parameters, e.g. air data parameters, including without limitation altitude, speed such as air speed, and temperature. In another embodiment, such parameters may be obtained from the vehicle management system or the vehicle management computer. In another embodiment, the vehicle management system or the vehicle management computer may also determine the threshold velocity and/or threshold angle. Upon determining the onset of a stall condition, the processing system 116 of the stall detection system 302 commands the alert system 130 to issue an alert and/or cause the vehicle 301, e.g. through the alert system 130, to avoid or exit the stall condition, and cease such activity when the onset of a stall condition no longer exists.

In one embodiment, the stall detection system 302 obtains vector velocity and density data by performing measurements in the measurement region 314 above the foil 303 by projecting, in a fixed direction, three, four, or more light beams, e.g. to create a cone where the measurement region is within the cone. In another embodiment, the stall detection system 302 obtains vector velocity and density data by performing measurements in the measurement region 314 above the foil 303 by conically scanning at least one at least one light beam 312, e.g. using a velocity-azimuth-display technique. The optics 106 are used to steer the at least one light beam 312. In another embodiment, the optical transceiver 104 or an optical detector in the optical transceiver 104 can be steered. In a further embodiment, the stall detection system 302 obtains vector velocity and density data by performing measurements in the measurement region 314 above the foil 303 by pointing the at least one light beam 312 in three or more different directions away from the foil 303, e.g. using the Doppler-beam-swinging or modified Doppler-beam-swinging techniques.

Figure 3B:
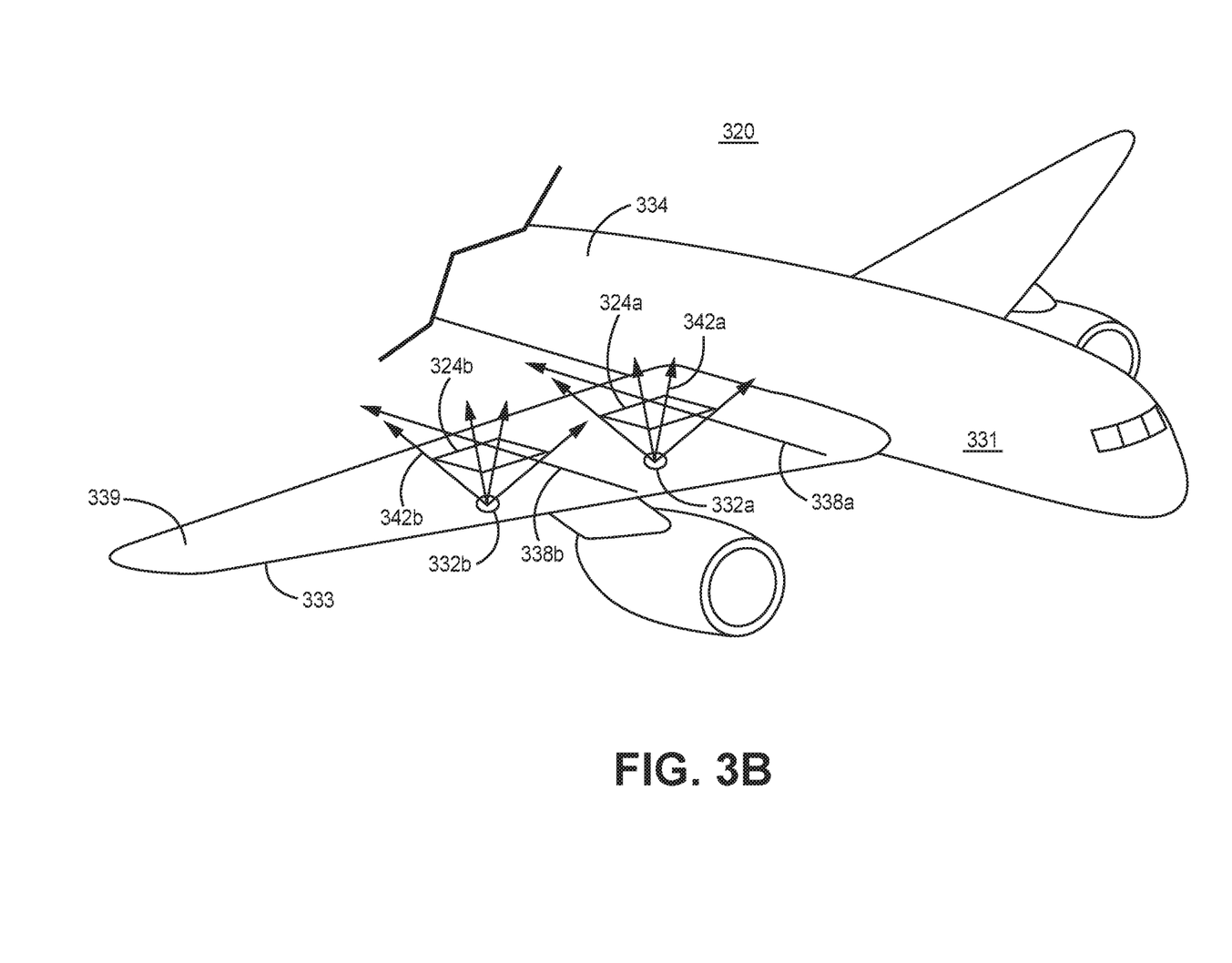
FIG. 3B illustrates an exemplary placement of two stall detection systems on or in a foil of a vehicle.

FIG. 3B illustrates an exemplary placement first and second stall detection systems 332a, 332b on or in a foil 333 of a vehicle 331. In one embodiment two or more stall detection systems can be placed on or in the foil 333 of the vehicle 331.

In one embodiment, the first stall detection system 332a, emitting at least one light beam 342a, is mounted on or in the foil 333, having a first measurement region 334a above the top surface 339 of the foil 333 where the onset of a stall condition first occurs. The second stall detection system 332b, emitting at least one light beam 342b, is mounted on or in the foil 333, having a second measurement region 334b above the top surface of the foil 332.

In one embodiment, the first and second optical stall detection systems 332a, 332b together detect the onset of a stall condition, including using at least one of the techniques described with respect to the embodiments of FIG. 3A. In another embodiment, the first stall detection system 332a detects a stall condition where a stall condition would, e.g. first, occur, such as at the root 337 of the foil 333. The second stall detection system 332b detects the onset of the stall condition where a stall condition would occur at the same time or after the stall condition would first occur, e.g. elsewhere on the foil 333. Thus, the measurements of the first stall detection system 332a and the second stall detection system 332b can be compared, e.g. by the processing system 116, to confirm the onset of a stall condition. Upon determining, e.g. confirming, the onset of a stall condition, the processing system(s) 116 of one or both of the stall detection systems 332a, 332b will command the alert system 130 to issue an alert and/or cause the vehicle 331, e.g. through the alert system 130, to avoid or exit the stall condition, and cease such activity when the onset of a stall condition no longer exists.

Figure 3C:
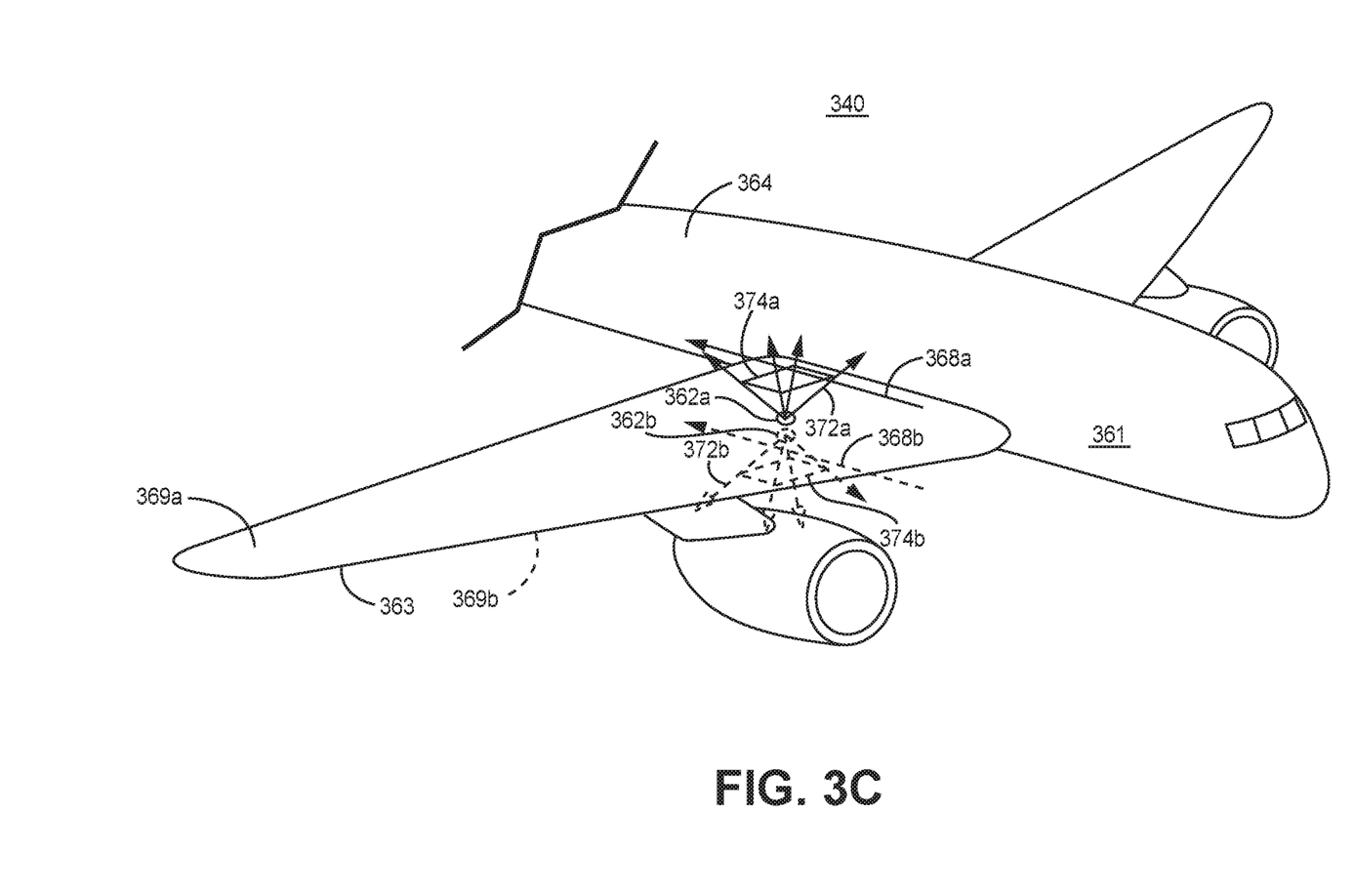
FIG. 3C illustrates an exemplary placement of a first and second stall detection systems on or in a foil of a vehicle.

FIG. 3C illustrates another exemplary placement first and second stall detection systems 362a, 362b on or in a foil 363 of a vehicle 361. Although the first and second stall detection systems 362a, 362b, respectively emitting first and second at least one light beams 372a, 372b, are specified, just optical systems 103 can be used in their place. The optical systems 103 can be coupled to a common processing system 116.

The first and second stall detection systems 362a, 362b are respectively placed above or on the top surface 369a of the foil 363, and below or on the bottom surface 369*b* of the foil. In this embodiment, the first stall detection system 362*a* can be used to measure respectively a first fluid flow 368*a* above the foil 363. Such measurements are in a first measurement region 374*a* above the top surface 369*a*.

In one embodiment, the first stall detection system 362*a* detects the onset of a stall condition, including using at least one of the techniques described with respect to the embodiments of FIG. 3A. Further, the first stall detection system 362*a* and the second stall detection system 362*b* are used to determine the differential pressure above and below the foil 363. In one embodiment, the first stall detection system 362*a* and the second stall detection system 362*b* measure fluid density respectively above and below the foil 363. The fluid density measurement is used to determine the differential pressure above and below the foil 363. If the differential pressure drops below a threshold level, or if it changes dramatically in a short period of time, this may indicate the onset of a stall condition. In another embodiment, the vector velocity measurements of the first stall detection system 362*a* and differential fluid pressure, e.g. density, measurements can be compared, e.g. by the processing system 116, to confirm the onset of a stall condition. Upon determining, e.g. confirming, the onset of a stall condition, the processing system(s) 116 of one or both stall detection systems 362*a*, 362*b* commands the alert system 130 to issue an alert and/or cause the vehicle 361, e.g. through the alert system 130, to avoid or exit the stall condition, and cease such activity when the onset of a stall condition no longer exists.

Figure 4:
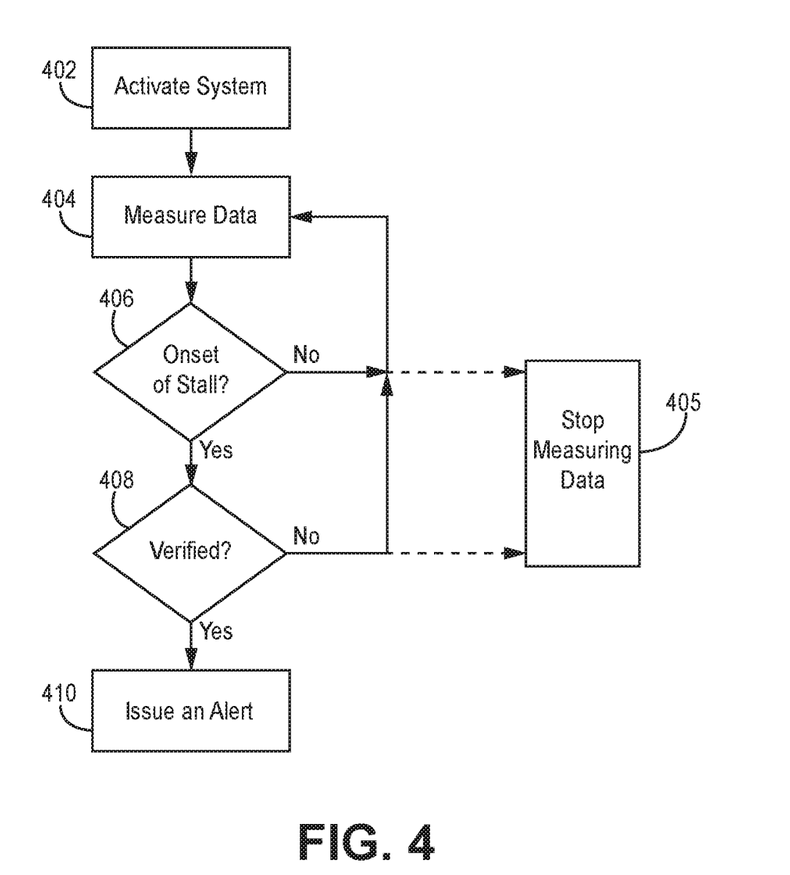
FIG. 4 illustrates one embodiment of operation of a vehicle with at least one stall detection system.

FIG. 4 illustrates one embodiment of operation of a vehicle 101 with at least one stall detection system 102. In one embodiment, in block 402, activate the stall detection system 102. In this embodiment, the stall detection system 102 may only be used if another sensor, such as an angle of attack vane indicates the onset of a stall condition, e.g. because a relatively large angle of attack is measured by the vane. In an alternative embodiment, the stall detection system 102 is activated before or during the initial movement of the vehicle 101, e.g. after vehicle 101 launch such as aircraft takeoff.

In block 404 measure data which would indicate the presence of turbulent fluid flow proximate to a foil, e.g. measure at least one of vector velocity of fluid flow proximate to the foil, the density of fluid flow above and below the foil, a change in Doppler shift of light backscattered from fluid flowing proximate to the foil, and variations of signal level (as described above). In one embodiment, measure the presence of turbulent fluid flow proximate to a foil, e.g. about at least one surface of a foil. In block 406, determine if the onset of a stall condition has occurred. In one embodiment determine if the measured data is greater than or less than (as appropriate) corresponding threshold level(s). Such threshold level(s) may be programmed in to the processing system 116, e.g. based upon performance data for the vehicle 101, based on settings input by the operator of the vehicle 101, and/or may be based upon real time parameters measurements made by sensors on the vehicle 101. If the onset of a stall condition is not detected, either in block 405 cease measuring data (e.g. deactivate the stall detection system 102 including the transmission of laser light beams), or return to block 404 and continue to measure data. In one embodiment, upon returning to block 404, continue to measure data for a finite period of time. In another embodiment, upon returning to block 404, continue to measure data until the vehicle 101 begins to cease or has ceased movement, e.g. is terminating or has terminated travel such as landing or has landed.

In one embodiment, proceed to block 410. In another embodiment, in block 408, if the onset of a stall is detected, then confirm or verify the onset of a stall. In another embodiment, confirmation or verification can be ascertained by measuring differential pressure or fluid density with the two stall detection systems (e.g. as described above) or based upon other measurements from other devices. For example, such measurements and other devices can include one or more of the following: (a) speed measured by a LIDAR system (other than the stall detection system 102) and/or a pitot tube, and (b) angle of attack measured by an angle of attack vane. Thus, for example, if an angle of attack vane is used to verify the onset of a stall condition identified by the stall detection system 102, verification would only take place if the angle of attack vane indicated that the angle of attack was greater than a threshold level, e.g. twenty degrees.

If no verification is performed, in block 410, then issue an alert and/or cause the vehicle 101, e.g. through the alert system 130, to avoid or exit the stall condition, and cease such activity when the onset of a stall condition no longer exists.

If verification is performed, and the onset of a stall is verified, then in block 410 issue an alert and/or cause the vehicle 101, e.g. through the alert system 130, to avoid or exit the stall condition, and cease such activity when the onset of a stall condition n no longer exists. If verification is performed, and the onset of a stall is not verified, then either in block 405 cease measuring data (e.g. deactivate the stall detection system 102 including the transmission of laser light beams), or return to block 404 and continue to measure data. In one embodiment, upon returning to block 404, continue to measure data for a finite period of time. In another embodiment, upon returning to block 404, continue to measure data until the vehicle 101 begins to cease or has ceased movement, e.g. is landing or has landed.

The components described throughout this disclosure (such as the at least one processing device 108, or sub-parts thereof, for example) may be implemented using one or more computer systems, field programmable gate arrays (FPGAs), or similar devices and executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

The term "vertical" refers to a direction perpendicular to the horizontal. Terms such as "on," "side" (as in "sidewall"), "higher," "lower," "over," "top," and "under" are defined with respect to the conventional plane or working surface being on the top surface of a foil, regardless of orientation.

Example Embodiments

Example 1 includes an apparatus, comprising: a stall detection system comprising an optical system coupled to a processing system; wherein the stall detection system is configured detect an onset of a stall condition in at least one measurement region proximate to a foil by characterizing a fluid flowing in the at least one measurement region proximate to the foil; and wherein, upon detecting the onset of the stall condition, the processing system is configured to perform at least one of: generating an alert, and causing a vehicle to avoid or exit the stall condition.

Example 2 includes the apparatus of Example 1, wherein the stall detection system is a LIDAR system.

Example 3 includes the apparatus of any of Examples 1-2, wherein the stall detection system comprises: an optical transceiver; wherein the optical transceiver is configured to emit at least one light beam; optics optically coupled to the optical transceiver; and wherein the optics is configured to direct the at least one light beam.

Example 4 includes the apparatus of any of Examples 1-3, wherein the stall detection system further comprises a window.

Example 5 includes the apparatus of any of Examples 1-4, further comprising an alert system coupled to the processing system; and wherein the alert system is configured to perform at least one of: generating the alert when the stall detection system detects the onset of the stall condition, and causing the vehicle to avoid or exit the stall condition.

Example 6 includes the apparatus of any of Examples 1-5, wherein the optical transceiver emits a light beam proximate to a surface of the foil.

Example 7 includes the apparatus of Example 6, wherein the light beam is configured to be substantially perpendicular to fluid flowing over the foil.

Example 8 includes the apparatus of any of Examples 6-7, wherein the light beam detects the onset of a stall in a measurement region based upon at least one of: a Doppler shift in the frequency of the backscatter of the light beam, and an increase in signal variation.

Example 9 includes the apparatus of any of Examples 1-8, wherein the optical transceiver is configured to emit a first light beam over a first surface of the foil in a first at least one measurement region; wherein the stall detection system comprises a second optical transceiver; wherein the second optical transceiver is configured to emit a second light beam over a second surface of the foil in a second at least one measurement region; and wherein the stall detection system is configured ascertain the onset of a stall condition in the two at least one measurement regions about the foil by characterizing the difference of a parameter related to pressure in each of the at least one measurement regions.

Example 10 includes the apparatus of any of Examples 1-9, wherein the optical system is configured to measure the vector velocity of the fluid in the at least one measurement region by one of: projecting, in a fixed direction, three or more light beams, and steering an optical beam.

Example 11 includes a method of determining the onset of a stall condition for a vehicle, comprising: measuring, with an stall detection system, data which would indicate the presence of turbulent fluid flowing proximate to a foil; determining from the data whether an onset of a stall condition has occurred; and upon determining the onset of the stall condition, performing at least one of: issuing an alert, and causing the vehicle to avoid or exit the stall condition, and cease such activity when the onset of the stall condition no longer exists.

Example 12 includes the method of Example 11, wherein measuring, with an stall detection system, data which would indicate the presence of turbulent fluid flowing proximate to the foil comprises measuring at least one of: vector velocity of fluid flowing proximate to the foil, parameters related to pressure of fluids flowing above and below the foil, a change in Doppler shift of light backscattered from fluid flowing proximate to the foil, and an increase of signal variation.

Example 13 includes the method of any of Examples 11-12, further comprising verifying, with at least one other measurement, whether the onset of a stall has occurred; and wherein upon determining the onset of a stall condition, perform at least one of: issuing an alert, and causing the vehicle to avoid or exit the stall condition, and cease such activity when the onset of the stall condition no longer exists comprises only upon verification by the one or more other measurements that the onset of a stall has occurred, perform at least one of: issuing an alert, and causing the vehicle to avoid or exit the stall condition, and cease such activity when the onset of the stall condition no longer exists.

Example 14 includes the method of Example 13, wherein further comprising verifying, with at least one other measurement, whether the onset of a stall has occurred comprises verifying using measurements from an angle of attack vane.

Example 15 includes a system, comprising: a vehicle including at least one foil; a stall detection system comprising: an optical system coupled to a processing system; and wherein the stall detection system is configured detect an onset of a stall condition in at least one measurement region about a foil by characterizing a fluid flowing in the at least one measurement region proximate to the foil; an alert system coupled to the processing system; and wherein, upon the stall detection system detecting the onset of a stall, the alert system is configured to perform at least one of: generating an alert, and causing a vehicle to avoid or exit the stall condition.

Example 16 includes the system of Example 15, wherein the stall detection system comprises: an optical transceiver; wherein the optical transceiver is configured to emit at least one light beam; optics optically coupled to the optical transceiver; a window; and wherein the optics is configured to direct the at least one light beam through the window.

Example 17 includes the system of any of Examples 15-16, wherein the optical transceiver emits a light beam proximate to the of the foil.

Example 18 includes the system of Example 17, wherein the light beam is configured to be substantially perpendicular to fluid flowing over the foil.

Example 19 includes the system of any of Examples 15-18, wherein the optical transceiver is configured to emit a first light beam over a first surface of the foil in a first at least one measurement region; wherein the stall detection system comprises a second optical transceiver; wherein the second optical transceiver is configured to emit a second light beam over a second surface of the foil in a second at least one measurement region; and wherein the stall detection system is configured ascertain the onset of a stall condition in the two at least one measurement regions about the foil by characterizing the difference of a parameter related to pressure in each of the at least one measurement regions.

Example 20 includes the system of any of Examples 15-19, wherein the optical system is configured to measure the vector velocity of the fluid in the at least one measurement region by one of: projecting, in a fixed direction, three or more light beams, and steering the optical beam.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus, comprising:
   a stall detection system comprising an optical system coupled to a processing circuit;
   wherein the optical system comprises:
      an optical transceiver;
         wherein the optical transceiver is configured to emit at least one light beam;
      optics optically coupled to the optical transceiver;
         wherein the optics is configured to direct the at least one light beam; and
      wherein the optical transceiver is configured to detect backscattered light of the at least one light beam;
   wherein the stall detection system is configured to detect an onset of a stall condition of a foil of a vehicle in at least one measurement region over the foil by characterizing a fluid flowing in the at least one measurement region over the foil by characterizing the backscattered light from the at least one measurement region;
   wherein the detection of the onset of the stall condition in the at least one measurement region is determined based upon at least one of: a Doppler shift in the frequency of the backscatter of the light beam, and an increase in signal variation; and
   wherein, upon detecting the onset of the stall condition, the processing circuit is configured to perform at least one of: generating an alert, and causing an automatic pilot to cause the vehicle to avoid or exit the stall condition.

2. The apparatus of claim 1, wherein the stall detection system is a LIDAR system.

3. The apparatus of claim 1, wherein the stall detection system further comprises a window.

4. The apparatus of claim 1, wherein the optical transceiver emits a light beam over a surface of the foil.

5. The apparatus of claim 4, wherein the light beam is configured to be substantially perpendicular to fluid flowing over the foil.

6. The apparatus of claim 1, wherein the optical transceiver is configured to emit a first light beam over a first surface of the foil in a first at least one measurement region;
   wherein the stall detection system comprises a second optical transceiver;
   wherein the second optical transceiver is configured to emit a second light beam over a second surface of the foil in a second at least one measurement region; and
   wherein the stall detection system is configured to ascertain the onset of a stall condition in the two at least one measurement regions about the foil by characterizing the difference of a parameter related to pressure in each of the at least one measurement regions.

7. The apparatus of claim 1, wherein the optical system is configured to measure the vector velocity of the fluid in the at least one measurement region by one of: projecting, in a fixed direction, three or more light beams, and steering an optical beam.

8. A method of determining a vehicle, comprising:
   transmitting at least one light beam;
   measuring data which would indicate the presence of turbulent fluid flowing in at least one measurement region the foil of the vehicle, by characterizing backscattered light from the at least one measurement region and of the at least one light beam;
   determining from the data whether the onset of the stall condition of the foil in the at least one measurement region over the foil has occurred;
   wherein the onset of the stall condition in the at least one measurement region is determined based upon at least one of: a Doppler shift in the frequency of the backscatter of the light beam, and an increase in signal variation; and
   upon determining the onset of the stall condition, performing at least one of: issuing an alert, and causing the vehicle to avoid or exit the stall condition, and cease such activity when the onset of the stall condition no longer exists.

9. The method of claim 8, wherein measuring data which would indicate the presence of turbulent fluid flowing in at least one measurement region over the foil comprises measuring at least one of: vector velocity of fluid flowing over the foil, parameters related to pressure of fluids flowing above and below the foil, a change in Doppler shift of light backscattered from fluid flowing over to the foil, and an increase of-signal variation.

10. The method of claim 8, further comprising verifying, with at least one other measurement, whether the onset of a stall has occurred; and
    wherein upon determining the onset of a stall condition, performing the at least one of: issuing the alert, and causing the vehicle to avoid or exit the stall condition, and cease such activity when the onset of the stall condition no longer exists comprises only upon verification by the one or more other measurements that the onset of a stall has occurred, performing at least one of: issuing an alert, and causing the vehicle to avoid or exit the stall condition, and cease such activity when the onset of the stall condition no longer exists.

11. The method of claim 10, wherein further comprising verifying, with at least one other measurement, whether the onset of a stall has occurred comprises verifying using measurements from an angle of attack vane.

12. A system, comprising:
    a vehicle including at least one foil;
    a stall detection system, comprising an optical system coupled to a processing circuit, configured to detect an onset of a stall condition of a foil of a vehicle in at least one measurement region over the foil by characterizing a fluid flowing in the at least one measurement region over the foil by characterizing the backscattered light from the at least one measurement region;
    wherein detection of the onset of a stall in the measurement region is determined based upon at least one of: a Doppler shift in the frequency of the backscatter of the light beam, and an increase in signal variation;
    wherein, upon the stall detection system detecting the onset of a stall, the processing circuitry is configured to perform at least one of: generating an alert, and causing the vehicle to avoid or exit the stall condition; and
    wherein the stall detection system comprises:
       an optical transceiver;
          wherein the optical transceiver is configured to emit at least one light beam;
       optics optically coupled to the optical transceiver; and
          wherein the optics is configured to direct the at least one light beam.

13. The system of claim 12, wherein the optical transceiver emits a light beam over to the foil.

14. The system of claim 13, wherein the light beam is configured to be substantially perpendicular to fluid flowing over the foil.

15. The system of claim 12, wherein the optical transceiver is configured to emit a first light beam over a first surface of the foil in a first at least one measurement region;
   wherein the stall detection system comprises a second optical transceiver;
wherein the second optical transceiver is configured to emit a second light beam over a second surface of the foil in a second at least one measurement region; and
wherein the stall detection system is configured to ascertain the onset of a stall condition in the two at least one measurement regions about the foil by characterizing the difference of a parameter related to pressure in each of the at least one measurement regions.

16. The system of claim 12, wherein the optical system is configured to measure the vector velocity of the fluid in the at least one measurement region by one of: projecting, in a fixed direction, three or more light beams, and steering the optical beam.

* * * * *